May 19, 1942.     A. GIBSON     2,283,249
MOLDING AND CUTTING DEVICE
Filed July 15, 1940
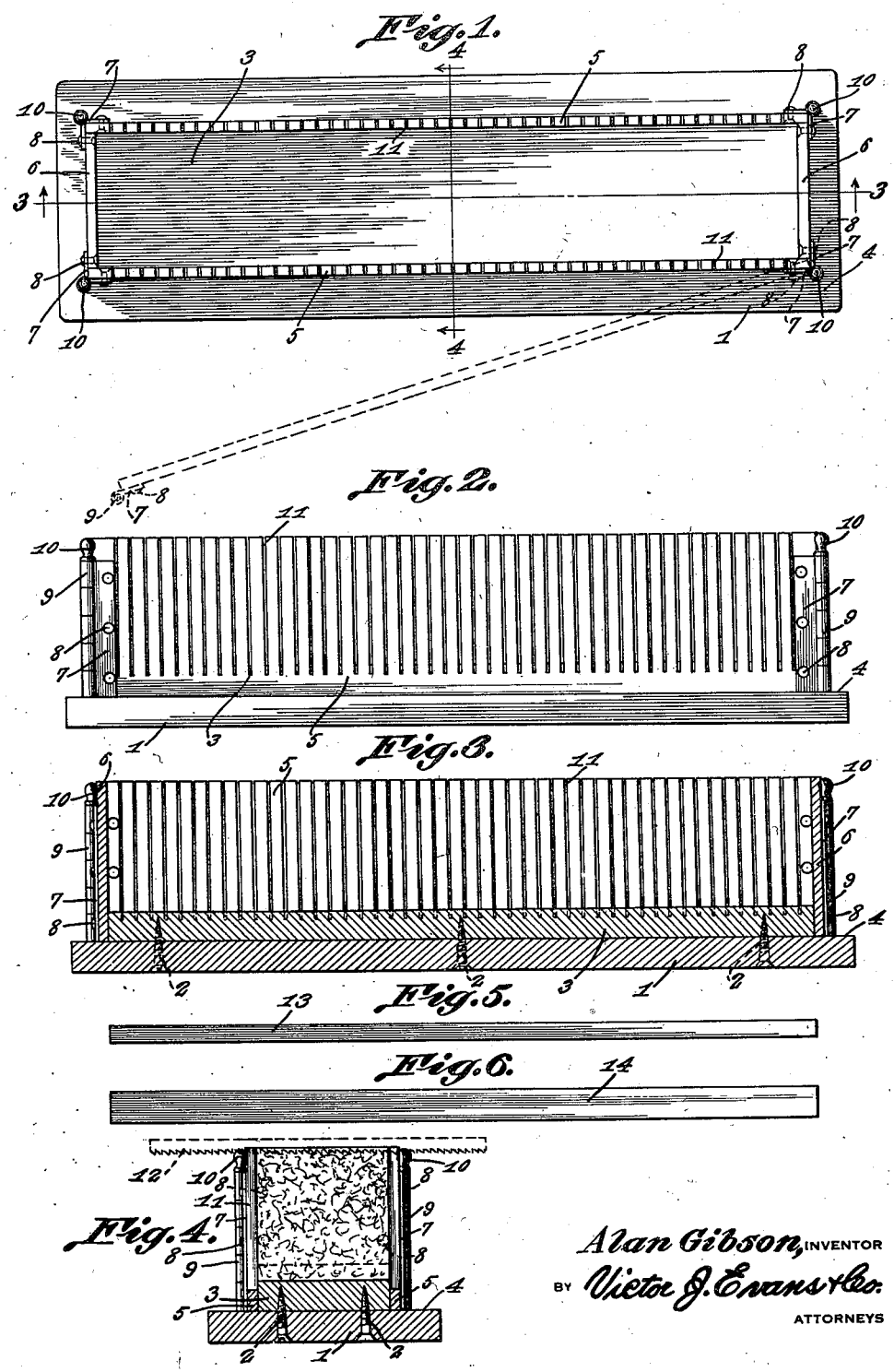
Alan Gibson, INVENTOR
BY Victor J. Evans & Co.
ATTORNEYS

Patented May 19, 1942

2,283,249

UNITED STATES PATENT OFFICE 2,283,249

MOLDING AND CUTTING DEVICE

Alan Gibson, Mineola, N. Y.

Application July 15, 1940, Serial No. 345,673

1 Claim. (Cl. 146—150)

This invention relates to food molding and cutting devices, and its general object is to provide a device that materially expedites the making of what is commonly known as hamburgers, in a clean and sanitary manner, as hamburgers are now generally made by squeezing off a portion of ground meat from a mass and patting the portion into a flat cake, while by the use of my device which consists essentially of a slotted mold, the meat is packed into the mold, and suitable cutting means is then drawn through the slots and meat for cutting the latter into thin uniform slices, desirable for making the well known hamburger sandwiches, thus it will be seen that my device eliminates the long and tedious method now employed.

A further object is to provide a mold for the purpose set forth, that includes interchangeable filler strips for varying the size of the slices.

Another object is to provide a molding and cutting device that is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a top plan view of the mold which forms the subject matter of the present invention.

Figure 2 is a side elevation thereof.

Figure 3 is a sectional view taken approximately on line 3—3 of Figure 1, looking in the direction of the arrows.

Figure 4 is a sectional view taken approximately on line 4—4 of Figure 1, looking in the direction of the arrows, and illustrates a fragmentary portion of the blade of a saw for slicing the meat in the process of making the hamburgers.

Figure 5 is a side view of one of the interchangeable filler strips.

Figure 6 is a similar view of another strip.

Referring to the drawing in detail, it will be noted that my mold in the form shown is of elongated rectangular formation and includes a base 1 having resting thereon and fixed thereto by screws 2 or the like, the bottom wall member 3 of the body of the mold, the member 3 being of less area than that of the base and is centrally arranged thereon to be spaced from the sides and ends of the base to provide what may be termed a supporting flange 4, for receiving the frame of the body for disposal in fitting relation about the member 3, as will be obvious upon inspection of Figures 3 and 4.

The frame is made up of side walls 5 and end walls 6, and each of the walls or sections 5 and 6 have fixed to the outer faces of the ends thereof, a hinge leaf 7, by rivets 8 in the form shown, but bolt and nut connections may be provided for that purpose, as will be apparent. In any event, each leaf includes barrels 9 arranged thereon for registration with the barrels of a companion leaf for receiving a removable headed pin 10. By that construction, it will be obvious that the walls 5 and 6 are detachably connected to each other, and can be applied accordingly in fitting engagement with and about the bottom wall member 3 for cooperation therewith to provide the mold for receiving the ground meat or the like therein. However, any one or all of the pins 10, can be removed in applying and removing the frame with respect to the flange and the bottom wall member.

The side walls 5 are provided with a plurality of equi-distantly spaced vertically arranged slots 11 extending through the tops thereof, but the slots terminate at their lower ends a sufficient distance above the bottoms of the side walls 5, so that the slots will extend below the upper face of the bottom wall member 3, when the frame is applied thereto, as clearly shown in Figure 3, and the slots of one wall 5 are disposed in registration with the slots of the other wall, when the frame is in place, for receiving and guiding the blade of a suitable cutting tool, such as for example the blade 12 of a saw, as will be apparent upon inspection of Figure 4.

From the above description and the disclosure in the drawing, it is believed that the use of my mold will be obvious, but it might be mentioned that the frame is first secured in place about the bottom wall member 3, and the mold is then packed with ground hamburg meat, or the like, level with the top of the frame, thence the blade of the cutting tool is drawn through the slots and the meat for cutting the latter in slices. The frame is then removed, as suggested in the dotted line position of one of the walls 5, of Figure 1, and the slices are then taken off by a spatula or the like, for immediate use or storage.

In order to vary the size of the slices, either or both of the filler strips 13 and 14 are used, and each strip is of the same length and width as that of the bottom wall member 3, but the strip 14 is of greater thickness than that of the strip 13, and the strip 14 may be of less thickness than that of the bottom wall member 3. In any event, when using either strip, it is placed upon the bottom wall member 3 and when both strips are used, they are placed one upon the other with one resting upon the member 3, as will be apparent. It will be further apparent that the strips fill up space within the mold, and thereby it will be seen that they act to decrease the quantity of the material that can be packed within the mold and consequently decrease the size of the slices.

Suitable bracing means may be provided for the side walls 5, if desired, such as for example, right angle members to be detachably secured to the base, for engagement with the outer faces of the walls 5 to prevent outward bulging thereof, but those walls are preferably of sufficient thickness to eliminate such bulging.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A ground meat molding and cutting device comprising a base of elongated rectangular formation, a body including a bottom wall member of less area than that of the base and fixed thereto by screws having their heads countersunk in the bottom of the base, said wall member being arranged on the top of the base for the latter to provide a marginal flange about said wall member, a frame including side and end walls, hinges including leaves secured to the outer faces of the side and end walls at the ends thereof, barrels formed on the leaves and engaging the outer corners of the frame along the height thereof, removable headed hinge pins disposed through the registering barrels of companion leaves for detachably connecting the frame walls to each other to rest upon the flange for disposal about and in engagement with said wall member for cooperation therewith to provide a mold for receiving material therein to be sliced, said side walls having vertically arranged slots disposed in equi-distantly spaced relation with respect to each other, the slots of one side wall being disposed in registration with those of the other and extending through the tops of their walls with their lower ends terminating for disposal below the upper face of said wall member, cutting means including a saw blade for passage through the slots for cutting the contents of the mold into slices, and filler strips of different thicknesses and adapted to be disposed within the bottom of the mold to vary the quantity of the contents thereof for varying the size of the slices.

ALAN GIBSON.